United States Patent [19]

Shope

[11] 4,239,056
[45] Dec. 16, 1980

[54] VALVE SERVICE BOX HAVING MEANS FOR SECURING DIFFERENT SIZED VALVES AGAINST ROTATION

[75] Inventor: Thomas Shope, Kearny, N.J.

[73] Assignee: CP Test Services-Valvco, Inc., Harrison, N.J.

[21] Appl. No.: 8,618

[22] Filed: Feb. 1, 1979

[51] Int. Cl.³ .............................................. F16K 27/12
[52] U.S. Cl. ................................... 137/370; 137/364; 137/797
[58] Field of Search ............... 137/364, 365, 366, 367, 137/368, 369, 370, 371, 797

[56] References Cited

U.S. PATENT DOCUMENTS

| | | | |
|---|---|---|---|
| 2,931,383 | 4/1960 | Handley | 137/369 |
| 3,601,143 | 8/1971 | Glennon | 137/364 |
| 4,030,519 | 6/1977 | Zinn | 137/364 |

Primary Examiner—Gerald A. Michalsky
Attorney, Agent, or Firm—Carella, Bain, Gilfillan & Rhodes

[57] ABSTRACT

A valve or curb service box having different sized pairs of opposed openings shaped to conform to the cross section of a valve body thereby securing the valve against substantial rotation from a desired vertical orientation, each opening being provided with a detachable cover which may be removed from any pair of opposed openings to accommodate a valve of complimentary shape and dimension and which when unremoved on adjacent openings provides bearing surfaces for back-fill thereby providing both structural strength for the valve housing against distortion and a barrier against intrusion of fill around the valve housed therewithin.

65 Claims, 4 Drawing Figures

VALVE SERVICE BOX HAVING MEANS FOR SECURING DIFFERENT SIZED VALVES AGAINST ROTATION

BACKGROUND OF THE INVENTION

Valve service boxes, commonly known as curb boxes, are well known in the art. Modern valve boxes are generally fabricated of some suitable plastic such as either a filled or unfilled ABS. The upper portion comprises generally a pair of telescoping tubular members, the lower member of which terminates in a valve housing. A typical such valve service box is illustrated in U.S. Pat. No. 3,601,143.

With the advent of plastic pipe certain problems have arisen which were not experienced earlier with metal pipe. The valve body is ordinarily engaged to the pipe by some suitable threaded fitting. When fittings on opposite sides of the valve are tightened to secure the pipe segments thereto, internal stresses in the pipe are gradually and spontaneously relieved by counter rotation of the pipe. This rotation is transferred to the valve body displacing it from its normal vertical orientation. This, in turn, displaces the valve operating member from the vertical plane sometimes sufficiently to prevent its actuation from the surface.

Therefore, it is desirable to provide means on the curb box engageable with the valve housing to restrict its rotational displacement under the influence of relieving stresses in the pipes to which it is engaged. One such means are a pair of diametrically opposed openings in the housing portion of the valve service box. Each opening is non-circular and is shaped and dimensioned to conform with a complimentary non-circular portion of the valve body or fitting associated therewith which is employed to join the valve body to the pipe. The bottom-most portion of the non-circular opening in the housing communicates with a preferably outwardly and downwardly flaring opening communicating with the bottom edge of the housing. The housing is sufficiently flexible to permit the valve body to pass upwardly through the flared portion of the opening and snapengage into the non-circular portion thereof.

Another problem recently encountered in the art arises by virtue of the fact that different sized valves are now being employed for use with the same sized pipe. Consequently, housings had to be custom fitted to the particular sized valve being employed which is economically inefficient.

An obvious solution to the problem of different sized in a valve housing to accommodate at least two different sized valves. However, the use of two opposed pairs of openings so weakened the valve housing structurally that it tended to distort and thereby defeat the purpose of the non-circular openings to hold the valve body in its desired vertical orientation. The best solution to this problem does not lie in making the walls of the housing thicker and stronger which would greatly increase costs with only a marginal improvement in structural strength.

The solution lies in the structural features of the claimed invention herein which employs a cover which preferably overlies each opening and which may be easily detached therefrom. When in use, the covers overlying the openings to receive the valve are detached but the covers on the other pair of opposed openings are left in place. These covers provide bearing surfaces or fill around the housing which bearing surface transmits the lateral forces of the fill to the housing as a whole thereby generating the requisite structural rigidity necessary to prevent undesired rotation of the valve body.

Preferably, the covers are formed integrally with the molded housing and are partially severed from the bottom edge of the housing upwardly requiring but a small saw cut for complete removal. This provides for attachment of the covers until such time as the user decides which pair of opposed valve openings is to be employed. Additionally, when the cover is formed as part of an outwardly extending flange defining the opening, pressure is transmitted from the cover to the flange and from thence to the housing body as a whole. With the cover being formed integrally with the top portion of the non-circular opening, the cover is structurally relatively rigid and undeformable in response to lateral stress applied by backfill.

Still another object of the present invention is to provide opposed pairs of outwardly and downwardly flaring bearing surfaces proximal to the top of the openings, preferably formed integrally with the housing on the tubular member extending therefrom which surfaces modify forces applied by backfill to the housing thereby increasing its structural integrity as well as generating additional vertical restraining forces against upward undesirable displacement of the housing as a whole.

SUMMARY OF THE INVENTION

A valve box comprising at least one vertically elongated member housing a generally axial passage open at the top and bottom; a hollow valve housing on the bottom of the elongated member open at its top and bottom, the open top communicating with the passage in the elongated member; the housing having at least two pairs of substantially diametrically opposed side openings each communicating with the bottom edge thereof; and a cover extending over each opening and detachably secured to the housing.

PREFERRED EMBODIMENT OF THE INVENTION

The objects and advantages aforesaid as well as other objects and advantages may be achieved by the valve service or curb box claimed herein a preferred embodiment of which is illustrated in the drawings in which:

Figure 1:
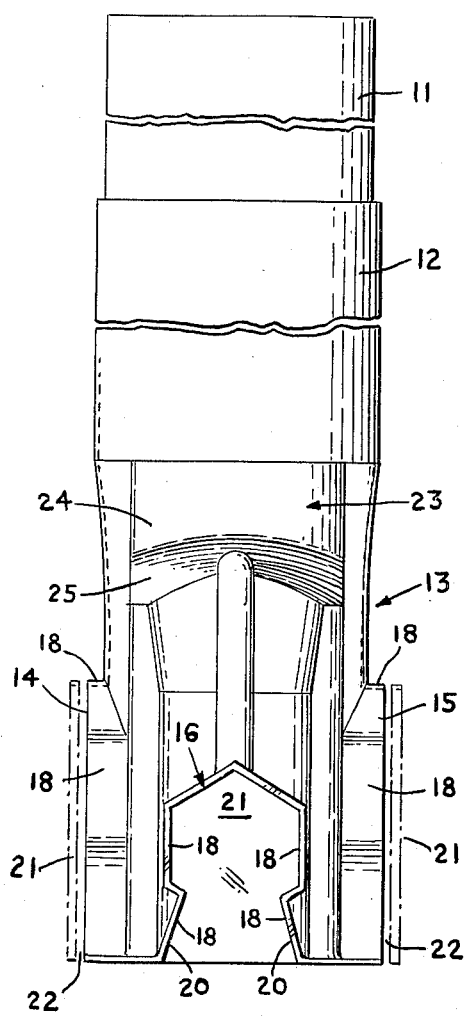
FIG. 1 is a side elevational view of the bottom-most portion of the valve service box with all opening covers in place.
Figure 2:
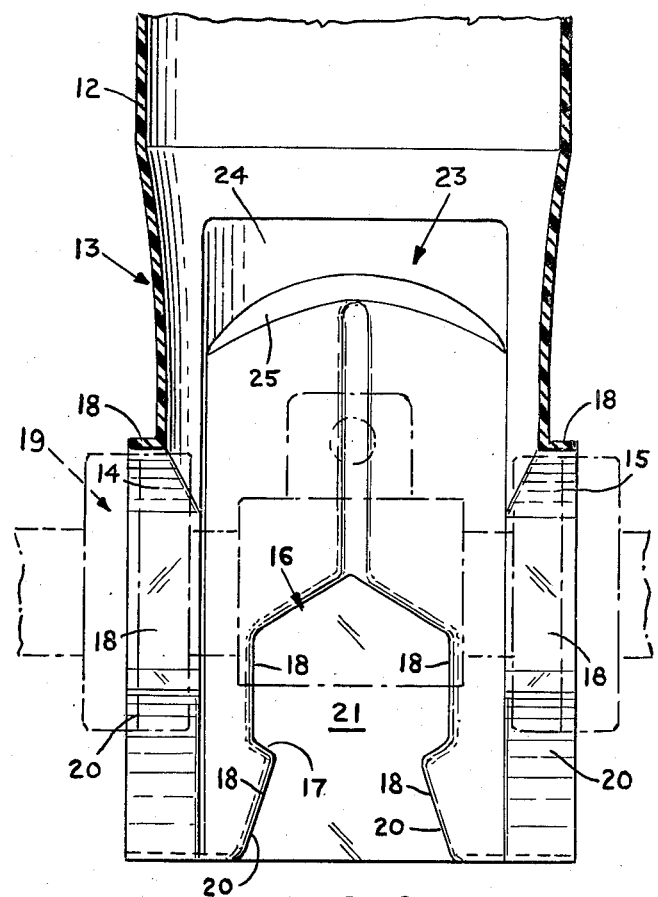
FIG. 2 is an enlarged side elevational cross-sectional view of the valve housing with a valve body shown in place.
Figure 4:
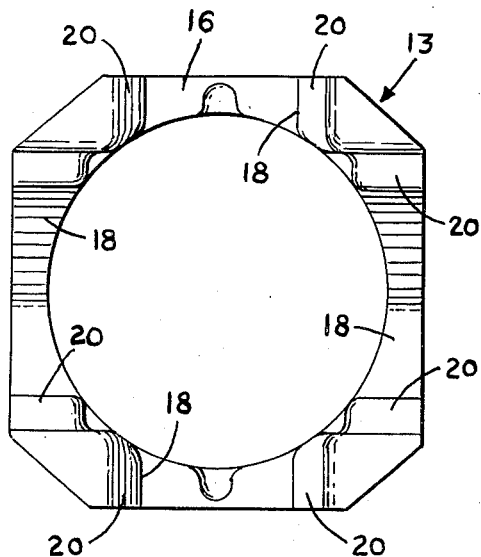
FIG. 4 is a bottom view of the valve housing.
Figure 3:
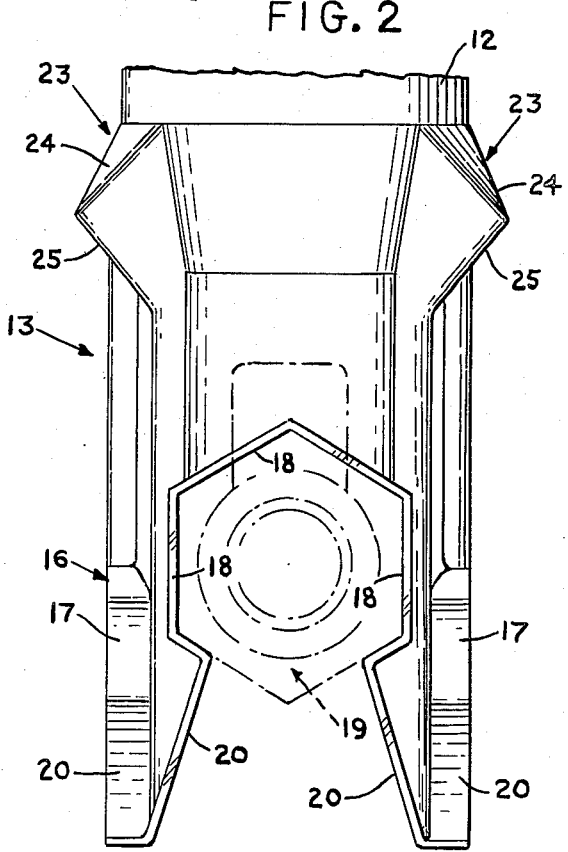
FIG. 3 is an end elevational view of the valve housing shown in FIG. 2.

Referring now to the drawings in detail, the valve service box comprises an upper tubular member 11 telescopically mounted in a lower tubular member 12. A hollow valve housing 13 is formed on the bottom of the lower tubular member 12 and is preferably integral therewith.

The valve housing 13 is provided with two pairs of diametrically opposed non-circular openings, respectively 14–15 and 16–17. Each pair of openings is defined by an outwardly extending peripheral flange 18.

The uppermost portion of each of the openings 14–15 and 16–17 is shaped to conform to the non-circular, cross-sectional configuration of the valve body 19 projecting through the opening. Merely by way of illustration, the upper portion of the openings are shown as hexagonal although the particular non-circular configuration is optional. The lower portion of each opening flares outwardly and downwardly to provide cam surfaces 20, 20.

Each opening is provided with a cover 21 preferably formed integrally with the flange 18 adjacent to the top-most portion thereof. In practice, the flange 18 and cover 21 are formed integrally by a molding process and the cover 21 severed along a vertical plane 22 generally at the juncture of the cover 21 and flange 18. The plane of severance 22 terminates beneath the top-most portion of the respective openings, as for instance, beneath the two upper courses of the hexagon.

In order to accommodate valves of different sizes, openings 14 and 15 are dimensioned smaller than openings 16 and 17. Thus, each pair of openings, are both shaped and dimensioned to receive and seat valves of different sizes. Additionally, whereas only two pairs of opposed pairs may be employed depending upon the dimensions of the opposed openings as against the diameter of the valve housing 13.

A pair of diametrically opposed, external bearing surfaces and reinforcing supports 23, 23 are provided on the side of the tubular member 12 of the housing 13. Each such member 23 comprises an outwardly and downwardly flaring surface 24 and an upwardly and outwardly flaring surface 25.

In operation, the valve service box is distributed to the end user with the covers 21 still attached over all four openings 14-15 and 16-17. Depending upon the size of the valve to be accommodated, the covers 21 extending over the openings to be employed are severed by means of a saw cutting upwardly through the top most courses of the flange 18. The covers 21 on the other opposed openings remain unsevered. The housing 13 is then forced downwardly over the valve 19 engaging the cam surfaces 20—20 on each of the openings spreading the openings until the hexagonal cross-sectional portion of the valve body 19 seats within the respective openings. Since the valve box is placed over the valve before the earth is filled in, the respective openings expand easily. Nevertheless, when the valve box is in place, and dirt is filled in therearound, the remaining covers 21—21 provide bearing surfaces to compress those opposing sides of the valve housing 13 together so that the opposed openings in which the valve is seated remain relatively tightly engaged to the valve body to prevent rotational disorientation. Additionally, the covers 21—21 when still in tact with the flange 18 provide a bottom bearing surface or edge for the valve housing 13. Were the covers 21—21 on the unused openings notin place, the hollow valve housing 13 would be structurally very weak and tend to distort not only in placing vertical stress upon the valve body 19 but also permitting rotational disorientation thereof.

Additionally, the cam surfaces 24 and 25 formed above the valve housing 13 lend additional support against downward crushing or upward displacement of the valve housing 13.

It will be understood by those skilled in the art that many modifications and variations may be made with regard to the within invention without departing from the spirit and scope thereof.

What is claimed is:

1. A valve box comprising;
   (a) at least one vertically elongated member having a generally axial passage open at the top and bottom,
   (b) a hollow valve housing on the bottom of the elongated member open at its top and bottom, the open top communicating with the passage in the elongated member,
   (c) the housing having at least two pairs of substantially diametrically opposed side openings each communicating with the bottom edge thereof, and
   (d) a cover extending over each opening and detachably secured to the housing.
2. A valve box in accordance with claim 1 in which;
   (a) each cover overlies a side opening on the outside of the housing.
3. A valve box in accordance with any one of claims 1 or 2 in which;
   (a) each cover is secured to the housing only proximal to the top thereof.
4. A valve box in accordance with any one of claims 1 or 2 in which;
   (a) the housing is deformable to permit an enlargement of each side opening at the bottom thereof.
5. A valve box in accordance with any one of claims 1 or 2 and
   (a) an outwardly extending flange formed on the housing peripheral to each side, the cover extending over and engageable with said flange.
6. A valve box in accordance with any one of claims 1 or 2 in which;
   (a) a portion of each side opening is shaped to conform to a valve housing,
   (b) a constriction in each side opening beneath that portion conforming to the shape of the valve housing,
   (c) the housing being deformable sufficiently to enlarge each side opening to receive a valve body passing upwardly from the bottom thereof.
7. A valve box in accordance with any one of claims 1 or 2 and
   (a) means on the housing engageable with a valve seated therewithin to prevent a substantial rotation of the valve with respect of said openings.
8. A valve box in accordance with any one of claims 1 or 2 in which
   (a) the openings have a non-circular peripheral configuration.
9. A valve box in accordance with claim 3 in which;
   (a) the housing is deformable to permit an enlargement of each side opening at the bottom thereof.
10. A valve box in accordance with claim 3 in which;
    (a) an outwardly extending flange formed on the housing peripheral to each side, the cover extending over and engageable with said flange.
11. A valve box in accordance with claim 4 in which;
    (a) an outwardly extending flange formed on the housing peripheral to each side, the cover extending over and engageable with said flange.
12. A valve box in accordance with claim 9 in which;
    (a) the outwardly extending flange formed on the housing peripheral to each side, the cover extending over and engageable with said flange.
13. A valve box in accordance with claim 3 in which,
    (a) a portion of each side opening is shaped to conform to a valve housing,
    (b) a constriction in each side opening beneath that portion conforming to the shape of the valve housing, (c) the housing being deformable sufficiently to enlarge each side opening to receive a valve body passing upwardly from the bottom thereof.

14. A valve box in accordance with claim 4 in which;
(a) a portion of each side opening is shaped to conform to a valve housing;
(b) a constriction in each side opening beneath that portion conforming to the shape of the valve housing,
(c) the housing being deformable sufficiently to enlarge each side opening to receive a valve body passing upwardly from the bottom thereof.

15. A valve box in accordance with claim 5 in which;
(a) a portion of each side opening is shaped to conform to a valve housing;
(b) a constriction in each side opening beneath that portion conforming to the shape of the valve housing,
(c) the housing being deformable sufficiently to enlarge each side opening to receive a valve body passing upwardly from the bottom thereof.

16. A valve box in accordance with claim 9 in which;
(a) a portion of each side opening is shaped to conform to a valve housing,
(b) a constriction in each side opening beneath that portion conforming to the shape of the valve housing,
(c) the housing being deformable sufficiently to enlarge each side opening to receive a valve body passing upwardly from the bottom thereof.

17. A valve box in accordance with claim 10 in which;
(a) a portion of each side opening is shaped to conform to a valve housing,
(b) a constriction in each side opening beneath that portion conforming to the shape of the valve housing,
(c) the housing being deformable sufficiently to enlarge each side opening to receive a valve body passing upwardly from the bottom thereof.

18. A valve box in accordance with claim 11 in which;
(a) a portion of each side opening is shaped to conform to a valve housing,
(b) a constriction in each side opening beneath that portion conforming to the shape of the valve housing,
(c) the housing being deformable sufficiently to enlarge each side opening to receive a valve body passing upwardly from the bottom thereof.

19. A valve box in accordance with claim 12 in which;
(a) a portion of each side opening is shaped to conform to a valve housing,
(b) a constriction in each side opening beneath that portion conforming to the shape of the valve housing,
(c) the housing being deformable sufficiently to enlarge each side opening to receive a valve body passing upwardly from the bottom thereof.

20. A valve box in accordance with claim 3 and
(a) means on the housing engageable with a valve seated therewithin to prevent a substantial rotation of the valve with respect of said openings.

21. A valve box in accordance with claim 4 and
(a) means on the housing engageable with a valve seated therewithin to prevent a substantial rotation of the valve with respect of said openings.

22. A valve box in accordance with claim 5 and
(a) means on the housing engageable with a valve seated therewithin to prevent a substantial rotation of the valve with respect of said openings.

23. A valve box in accordance with claim 6 and
(a) means on the housing engageable with a valve seated therewithin to prevent a substantial rotation of the valve with respect of said openings.

24. A valve box in accordance with Claim 9 and
(a) means on the housing engageable with a valve seated therewithin to prevent a substantial rotation of the valve with respect of said openings.

25. A valve box in accordance with claim 10 and
(a) means on the housing engageable with a valve seated therewithin to prevent a substantial rotation of the valve with respect of said openings.

26. A valve box in accordance with claim 11 and
(a) means on the housing engageable with a valve seated therewithin to prevent a substantial rotation of the valve with respect of said openings.

27. A valve box in accordance with claim 12 and
(a) means on the housing engageable with a valve seated therewithin to prevent a substantial rotation of the valve with respect of said openings.

28. A valve box in accordance with claim 13 and
(a) means on the housing engageable with a valve seated therewithin to prevent a substantial rotation of the valve with respect of said openings.

29. A valve box in accordance with claim 14 and
(a) means on the housing engageable with a valve seated therewithin to prevent a substantial rotation of the valve with respect of said openings.

30. A valve box in accordance with claim 15 and
(a) means on the housing engageable with a valve seated therewithin to prevent a substantial rotation of the valve with respect of said openings.

31. A valve box in accordance with claim 16 and
(a) means on the housing engageable with a valve seated therewithin to prevent a substantial rotation of the valve with respect of said openings.

32. A valve box in accordance with claim 17 and
(a) means on the housing engageable with a valve seated therewithin to prevent a substantial rotation of the valve with respect of said openings.

33. A valve box in accordance with claim 18 and
(a) means on the housing engageable with a valve seated therewithin to prevent a substantial rotation of the valve with respect of said openings.

34. A valve box in accordance with claim 19 and
(a) means on the housing engageable with a valve seated therewithin to prevent a substantial rotation of the valve with respect of said openings.

35. A valve box in accordance with claim 3 in which;
(a) the openings have a non-circular peripheral configuration.

36. A valve box in accordance with claim 4 in which;
(a) the openings have a non-circular peripheral configuration.

37. A valve box in accordance with claim 5 in which;
(a) the openings have a non-circular peripheral configuration.

38. A valve box in accordance with claim 6 in which;
(a) the openings have a non-circular peripheral configuration.

39. A valve box in accordance with claim 7 in which;
(a) the openings have a non-circular peripheral configuration.

40. A valve box in accordance with claim 9 in which;

(a) the openings have a non-circular configuration.
41. A valve box in accordance with claim 10 in which;
(a) the openings have a non-circular peripheral configuration.
42. A valve box in accordance with claim 11 in which;
(a) the openings have a non-circular peripheral configuration.
43. A valve box in accordance with claim 12 in which;
(a) the openings have a non-circular peripheral configuration.
44. A valve box in accordance with claim 13 in which;
(a) the openings have a non-circular peripheral configuration.
45. A valve box in accordance with claim 14 in which;
(a) the openings have a non-circular peripheral configuration.
46. A valve box in accordance with claim 15 in which;
(a) the openings have a non-circular peripheral configuration.
47. A valve box in accordance with claim 16 in which;
(a) the openings have a non-circular peripheral configuration.
48. A valve box in accordance with claim 17 in which;
(a) the openings have a non-circular peripheral configuration.
49. A valve box in accordance with claim 18 in which;
(a) the openings have a non-circular peripheral configuration.
50. A valve box in accordance with claim 19 in which;
(a) the openings have a non-circular peripheral configuration.
51. A valve box in accordance with claim 20 in which;
(a) the openings have a non-circular peripheral configuration.
52. A valve box in accordance with claim 21 in which;
(a) the openings have a non-circular peripheral configuration.
53. A valve box in accordance with claim 22 in which;
(a) the openings have a non-circular peripheral configuration.
54. A valve box in accordance with claim 23 in which;
(a) the openings have a non-circular peripheral configuration.
55. A valve box in accordance with claim 24 in which;
(a) the openings have a non-circular peripheral configuration.
56. A valve box in accordance with claim 25 in which;
(a) the openings have a non-circular peripheral configuration.
57. A valve box in accordance with claim 26 in which;
(a) the openings have a non-circular peripheral configuration.
58. A valve box in accordance with claim 27 in which;
(a) the openings have a non-circular peripheral configuration.
59. A valve box in accordance with claim 28 in which;
(a) the openings have a non-circular peripheral configuration.
60. A valve box in accordance with claim 29 in which;
(a) the openings have a non-circular peripheral configuration.
61. A valve box in accordance with claim 30 in which;
(a) the openings have a non-circular peripheral configuration.
62. A valve box in accordance with claim 31 in which;
(a) the openings have a non-circular peripheral configuration.
63. A valve box in accordance with claim 32 in which;
(a) the openings have a non-circular peripheral configuration.
64. A valve box in accordance with claim 33 in which;
(a) the openings have a non-circular peripheral configuration.
65. A valve box in accordance with claim 34 in which;
(a) the openings have a non-circular peripheral configuration.

* * * * *

UNITED STATES PATENT OFFICE
CERTIFICATE OF CORRECTION

Patent No. 4,239,056            Dated December 16, 1980

Inventor(s) THOMAS SHOPE

It is certified that error appears in the above-identified patent and that said Letters Patent are hereby corrected as shown below:

Column 1 Lines 20-22

[internal stresses in the pipe are gradually and spontaneously relieved by counter rotation of the pipe.]

Insert --the pipe segments are rotationally stressed.
In time, the internal stresses in the pipe are gradually
and spontaneously relieved by counter rotation of the pipe.--

Column 1

Insert after Line 50 before line 51
--valves would be to employ at least two opposed pairs
of openings--

Column 2 Line 34

[botton] insert --bottom--

Column 3 Line 56

[notin] insert --not in--

Signed and Sealed this

Fifth Day of May 1981

[SEAL]

Attest:

RENE D. TEGTMEYER

Attesting Officer     Acting Commissioner of Patents and Trademarks